United States Patent Office 2,866,921
Patented Dec. 30, 1958

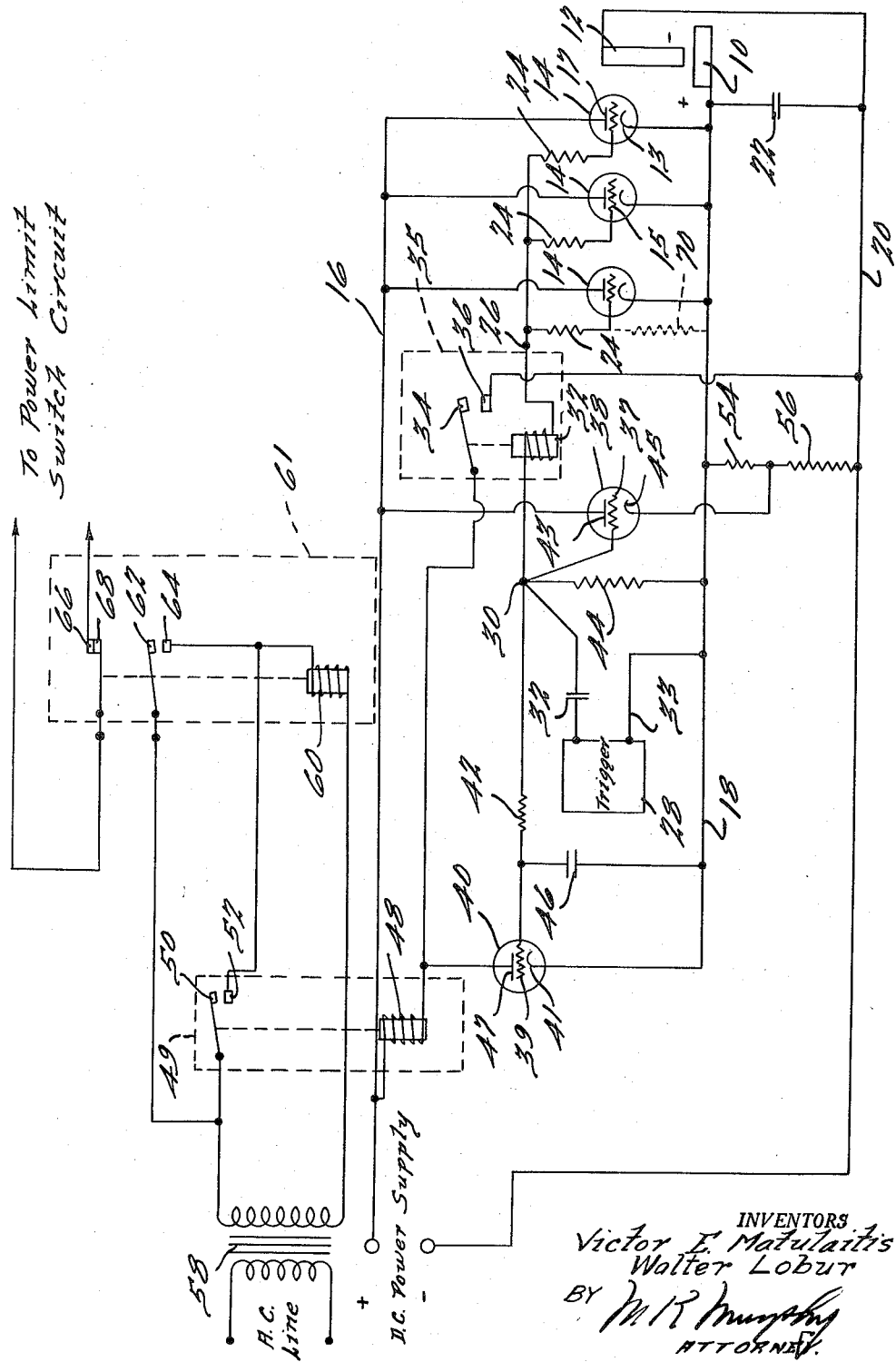

2,866,921

ARC MACHINING

Victor E. Matulaitis, Franklin, and Walter Lobur, Clawson, Mich., assignors to Elox Corporation of Michigan, Royal Oak, Mich.

Application February 23, 1956, Serial No. 567,186

4 Claims. (Cl. 315—127)

This invention relates to electronic circuits and particularly to safety devices for instantaneously shutting off the power input to an electronic circuit in response to failure of a component thereof, thereby to prevent damage to the circuit or to devices controlled by the circuit.

The invention is particularly useful in connection with the operation of electronically controlled electrical discharge machining apparatus, and the specific example herein described is intended for use with such apparatus—commonly referred to in the art as "arc-machining" apparatus. However, it is desired to point out that the safety device may be used in connection with almost any type of electronic circuit or device.

Reference is made to the copending application of V. E. Matulaitis, Serial No. 459,703, now Patent No. 2,804,575, which discloses and claims an arc-machining apparatus employing "hard" vacuum tubes in the control circuit thereof. The power requirements of such apparatus are relatively high and because vacuum tubes of high power capacity with desirable operating characteristics are not commercially obtainable, it is necessary to employ a plurality or "bank" of tubes in order to obtain the necessary plate or cathode current.

When a bank of tubes is utilized, the possibility of failure of the circuit rises naturally in accordance with the number of tubes used. Commercially obtainable tubes are relatively delicate devices and are subject to various types of operating troubles or malfunctions, particularly in those designs wherein the tube elements are disposed relatively close as in tubes designed to pass large amounts of current with low voltage drop. During continued operation of an electronic circuit employing such tubes, such troubles as set forth below may arise.

The cathode coating material may flake off and create a partial or complete short circuit of grid and cathode.

The grid wire may bend or buckle due to heat or imperfection in manufacture thereby creating a partial or complete short circuit of grid and cathode or of grid and anode.

The circuit from the grid to the external terminal of the tube may be broken by mechanical vibration, current overload or manufacturing imperfection.

Other difficulties may arise which will cause failure or malfunction of the electronic circuit. Such failure or malfunction may be extremely serious and costly in instances where the electronic device is controlling a machine tool because it may cause spoilage or damage to an intricate and expensive workpiece. In the instance of arc-machining, the risk of ruination of a workpiece costing thousands of dollars because of the failure of a relatively inexpensive vacuum tube represents a serious obstacle to the acceptance of arc-machining technique for many applications.

Such tube failures can result in work spoilage because the control "brain" may be completely knocked out of action. For example, in arc-machining control circuits now in use, if a single tube grid be short-circuited to either cathode or plate, this failure might drastically reduce or completely eliminate the drive signal to the other parallelly connected tubes by either overloading or short-circuiting the control or "trigger" circuit which functions normally to create pulses of current. In such event, the tube bank may pass a substantially constant or uninterrupted current whereupon a steady arc is created across the cutting gap and the work is damaged. A failure of a tube or component within the trigger circuit proper would result in a similar undesirable condition. In such case, there would be no "drive" to the tube bank and an uncontrolled D. C. arc would occur even though all of the tubes in the bank were without defect.

The primary object of this invention, therefore, is to provide automatically operable means for shutting off the power input to an electronically controlled device in the event of a component failure or malfunction in the control circuit.

Another object is to provide automatic means for cutting off the power to an arc-gap in an electronically controlled arc-machining apparatus in response to failure of a tube or circuit component in the tube bank or in the trigger device.

Other objects and advantages will appear from the following specification in which is described a specific example of our safety device.

In the drawing accompanying the specification, the figure is a schematic circuit of an arc-machining apparatus embodying circuitry which functions to protect the work from injury in the event of signal failure or fault in the main power tube bank.

Referring to the figure, it will be seen that we have shown schematically a workpiece 10 and an electrode 12 disposed such that an electrical discharge can take place across a gap between them. The electrode is connected to the negative side of a D. C. supply by means of conductor 20 and the workpiece is connected to a main conductor 18, which carries the positive side of the supply. A condenser 22 is preferably shunted across the gap, but this condenser may be eliminated in some instances without affecting operation of our safety or "watch-dog" device.

Power is supplied to the gap through a bank of "hard" vacuum tubes 14. The bank may consist of any desired or required number of tubes, depending upon the nature of the cutting to be done. The cathodes 13 are connected to the conductor 18, the anodes 17 are connected to a common conductor 16, and the control grids 15 are connected to a common terminal 26 through suitable suppressing resistors 24. Conductor 16 is connected to the positive terminal of the D. C. supply.

In the interest of brevity, detailed showing of the D. C. supply circuit has been eliminated, it being understood that this power source may be any one of a number of arc-machining apparatus supply circuits known in the art wherein suitable power limiting limit switch means is provided preferably actuated by a control winding.

Voltage is supplied to the grids 15 of the tube bank 14 by a suitable "trigger" control device 28. The output of the trigger is connected to the common conductor 18 by lead 33 and to a common terminal 30 through a coupling condenser 32. Lead 33 is the reference voltage connection to the trigger and may be connected to either conductor 18 or conductor 20 depending upon the details of the triggering network used.

For an example of a suitable triggering network, reference is made to the copending application of V. E. Matulaitis, Serial No. 459,703, filed October 1, 1954.

Terminal 30 is connected to terminal 26 through the coil 32 of a polarized relay 35 having contacts 34—36, which are open during current flow in the connection between terminals 26 and 30. The contact 34 is connected to the anode 47 of tube 40 and the contact 36 is connected to conductor 20.

The voltage at terminal 30 is also applied to the control grids 37 and 39 of tubes 38 and 40 respectively. A resistor 42 is connected in the lead to grid 39 and a condenser 46 is connected between the grid 39 and the conductor 18 to which the cathode 41 of tube 40 is connected. A suitable grid leak resistor 44 is connected between the terminal 30 and the common conductor 18.

The anode 43 of tube 38 is directly connected to conductor 16 and the anode 47 of tube 40 is connected to conductor 16 through coil 48 of a relay 49 which has a pair of normally open contacts 50—52.

The cathode 45 of tube 38 is connected to the juncture of a pair of series resistors 54, 56, which series are connected between the conductors 18 and 20 as shown. The resistors 54, 56, then, function as a potentiometer and impress on the cathode 45 a predetermined portion of the voltage existing across conductors 18 and 20.

A relay 61 having an actuating coil 60 and two sets of contacts 62—64 and 66—68, respectively, is operatively associated with the relay 49. The coil 60 is supplied from a transformer 58, the primary of which is connected to an A. C. line of suitable voltage. The coil 60 is energized when the contacts 50—52 of relay 49 are closed.

The contacts 62—64 of relay 61 are normally open and are connected in parallel with the normally open contacts 50—52 of relay 49. The normally closed contacts 66—68 of relay 61 are connected in series with the power supply to the power limiting circuit breaker or switch coil (not shown) which controls the D. C. power supply to the gap.

The "watch dog" device just described operates as follows:

Let it be assumed that the arc-machining apparatus is operating normally with the trigger 28 providing a pulsating voltage at terminal 30 in the manner described in the aforementioned copending application Serial No. 459,703. The net effect of this action will be to develop at terminal 30 an average negative voltage with respect to conductor 18 as the voltage of the trigger goes negative because of the grid leak bias, current flowing through resistor 44 from conductor 18 thereby effecting a change in the voltage across condenser 32. When the voltage of trigger 28 "swings positive," i. e. when the voltage at terminal 30 approaches that of conductor 18, current will flow from condenser 32 to terminal 30 and thence through grid 37 to cathode 45 of tube 38. Any time that the voltage of terminal 30 tries to become positive with respect to the junction of resistors 54—56 (which is at the same potential as cathode 45), tube 38 will conduct. It will be seen, therefore, that the average voltage at terminal 30 will be maintained negative with respect to the voltage of conductor 18.

The current flow into condenser 32 is alternating, current flowing in one direction from conductor 18 through resistor 44 and terminal 30 when the output of trigger 28 swings negative, then in the opposite direction from condenser 32 through terminal 30, grid 37, cathode 45 and resistor 56 to conductor 20, at the peak of the positive voltage swing. It follows then, that the current flowing through the grid leak resistor 44 is pulsating D. C. with the pulses flowing from conductor 18 to terminal 30, and the current flow through tube 38 (which functions as a diode) is substantially uni-directional from terminal 30.

By maintaining the cathode 45 of tube 38 at a slightly lower or "more negative" voltage than the cathodes 13 of tubes 14, which are all connected to conductor 18, the grid leak diode action is limited to tube 38 during normal operation of the circuit.

Tubes 14 then draw no grid current, so the current which flows from terminal 30 to terminal 26 is minute and is true A. C. The magnitude of this current is about that required to alternately charge and discharge the accumulated inter-electrode capacities of tubes 14. The sole purpose of tube 38 is to insure that, during normal operation, no substantial D. C. component exists in the conductor between terminals 30 and 26.

During normal operation of the arc-machining circuit, resistor 42 and condenser 46 act as an integrating network and impose a substantially uniform negative voltage on grid 39 of tube 40. The magnitude of this voltage is the average D. C. difference of potential between terminal 30 and conductor 18. Tube 40 is selected to provide characteristics such that this average negative voltage maintains the tube at cut-off, hence no current flows in relay coil 48.

Now assume that a fault develops within trigger 28, such as failure of a tube or other component thereof. Instantly, the average voltage at terminal 30 becomes relatively less negative with respect to conductor 18. Accordingly, the grid bias at tube 40 falls below cut-off value and tube 40 begins to conduct. Relay coil 48 is thus energized closing contacts 50—52 of relay 49.

Closure of contacts 50—52 energizes coil 60 of relay 61 and causes contacts 62—64 to close and contacts 66—68 to open. This opening of contacts 66—68 instantly effects opening of the main power input line to the apparatus and removes all power from conductors 16—20. All electrical activity at the gap ceases and possibility of damage to the workpiece 10 is prevented.

It will be noted that the relay contacts 62—64 provide a "latching action" when closed thereby insuring energization of coil 60 even though contacts 50—52 open, as they do when the main power circuit is opened. Positive and permanent opening of the main power circuit to leads 16 and 20 is thus assured even though the fault in the trigger 28 be of a transient or intermittent nature and no discharge can occur at the gap until the system has been "reset" by the operator through means not shown here. Thus, safety of the workpiece is assured.

Suppose that the fault should occur in the tube bank of tubes 14, for example, through breakdown between grid and cathode of a tube setting up a high resistance short circuit as represented by dotted resistor 70. As the voltage of terminal 30 becomes negative with respect to conductor 18, current will flow from 18 through the faulty tube (or through dotted resistor 70), thence through resistor 24, terminal 26, coil 32 of relay 35, to terminal 30, thereby paralleling the circuit through resistor 44. If of sufficient magnitude, these uni-directional current pulses will energize coil 32 sufficiently to cause the contacts 34—36 to close. Closure of contacts 34—36 will energize coil 48 of relay 49 and the main power circuit will be opened instantly as above described.

It will thus be seen that our "watch-dog" circuit functions continuously during operation of the arc-machining apparatus to monitor operation of the electronic components of the apparatus and to shut down the apparatus instantly should a fault develop which might result in damage to the workpiece.

As pointed out above, our safety circuit, either in the form described or in equivalent form, may be used in various applications and we do not intend to limit the scope of our invention except as set forth in the appended claims.

We claim:

1. In an arc-machining apparatus having automatically operable means for causing intermittent erosive electrical discharge across a gap between an electrode and a workpiece, a power limiting switch in the power supply to said apparatus, a triode vacuum tube bank interconnected between said power supply and said gap for controlling the gap discharge characteristic, a triggering device connected in the grid circuit of said tube bank for rendering said tube bank alternately conductive and non-conductive, means operable automatically in response to malfunction of the tube bank for opening said power limiting switch, and means operable automatically in response to malfunction of said triggering device for opening said power limiting switch.

2. In an arc-machining apparatus having automatically operable means for causing intermittent erosive electrical discharge across a gap between an electrode and a workpiece, a power limiting switch in the power supply to said apparatus, a triode vacuum tube bank interconnected between said power supply and said gap for controlling the gap discharge characteristic, a triggering device connected in the grid circuit of said tube bank for rendering said tube bank alternately conductive and non-conductive, and means operable automatically in response to malfunction of said tube bank for opening said power limiting switch comprising a vacuum tube, means connecting the cathode of said tube with the cathodes of said bank such that said tube cathode is maintained at a selected lower voltage relatively to the bank tube cathodes, means connecting the grid of said tube with the grids of said tube bank including a magnet field coil, and a switch operable in response to current flow in said coil to open said power limiting switch.

3. In an arc-machining apparatus having automatically operable means for causing intermittent erosive electrical discharge across a gap between an electrode and a workpiece, a power limiting switch in the power supply to said apparatus, a triode vacuum tube bank interconnected between said power supply and said gap for controlling the gap discharge characteristic, a triggering device connected in the grid circuit of said tube bank for rendering said tube bank alternately conductive and non-conductive, a triode tube, means connecting the grid of said triode in parallel with the grid circuit of the tube bank such that said triode is biased at cut-off by the normal output signal of the trigger and an electromagnetic device operable in response to conduction through said triode to open said power limiting switch.

4. In an arc-machining apparatus having automatically operable means for causing intermittent erosive electrical discharge across a gap between an electrode and a workpiece, a power limiting switch in the power supply to said apparatus, a triode vacuum tube bank interconnected between said power supply and said gap for controlling the gap discharge characteristic, a triggering device connected in the grid circuit of said tube bank for rendering said tube bank alternately conductive and non-conductive, and means operable automatically in response to malfunction of said triggering device for opening said power limiting switch including an electromagnetic switch having an actuating coil, a triode tube connected in the supply circuit to said coil and in the trigger output circuit such that said tube is rendered non-conducting during normal operation of the trigger and becomes conducting in response to abnormal operation of the trigger.

References Cited in the file of this patent

UNITED STATES PATENTS

| | | |
|---|---|---|
| 1,955,352 | Wallace | Apr. 17, 1934 |
| 1,975,812 | Wallace | Oct. 9, 1934 |
| 2,027,214 | Wideroe | Jan. 7, 1936 |
| 2,235,385 | Rava | Mar. 18, 1941 |
| 2,353,677 | Kummerer | July 18, 1944 |
| 2,548,246 | Walstrom | Apr. 10, 1951 |
| 2,571,027 | Garner | Oct. 9, 1951 |